(12) United States Patent  
Martin, Jr.

(10) Patent No.: US 8,467,680 B2
(45) Date of Patent: Jun. 18, 2013

(54) OPTICAL BANDWIDTH CONTROL DEVICE

(75) Inventor: Jack C. Martin, Jr., Cumming, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 275 days.

(21) Appl. No.: 12/961,563

(22) Filed: Dec. 7, 2010

(65) Prior Publication Data

US 2012/0141125 A1 Jun. 7, 2012

(51) Int. Cl.
*H04B 10/08* (2006.01)
*H04J 14/00* (2006.01)

(52) U.S. Cl.
USPC ............................................. 398/45; 398/33

(58) Field of Classification Search
USPC . 398/25; 359/110; 385/16; 342/372; 370/235
See application file for complete search history.

(56) References Cited

U.S. PATENT DOCUMENTS

| | | | |
|---|---|---|---|
| 5,861,971 A | 1/1999 | Devaux et al. | |
| 6,380,111 B1 * | 4/2002 | Maeda et al. | 501/64 |
| 7,489,864 B2 * | 2/2009 | Costa | 398/25 |
| 2007/0154137 A1 * | 7/2007 | Mino et al. | 385/16 |
| 2009/0273517 A1 * | 11/2009 | Thiesen et al. | 342/372 |
| 2010/0014821 A1 | 1/2010 | Tokushima | |
| 2011/0080829 A1 * | 4/2011 | Breslin et al. | 370/235 |

OTHER PUBLICATIONS

Directional Optical Taps and Monitors, OZ Optics, www.ozoptics.com, Mar. 5, 2009, p. 1-5.

* cited by examiner

*Primary Examiner* — Dalzid Singh
(74) *Attorney, Agent, or Firm* — Hoffman & Baron, LLP

(57) ABSTRACT

An in-line optical control device, method, and computer-readable medium for controlling bandwidth in a dry fiber line are provided herein. The in-line optical control device includes a splitter, an optical switch, and a processing device. The splitter may be configured to split an input signal. The optical switch may be configured to receive and selectively connect a first portion of the split input signal to the dry fiber line. The optical switch may thereby control a rate of data transmitted over the dry fiber line. The processing device may be configured to control the optical switch based on whether a characteristic of the input signal conforms to a predetermined limit using a second portion of the split input signal. The processing device may thereby control bandwidth in the dry fiber line.

19 Claims, 3 Drawing Sheets

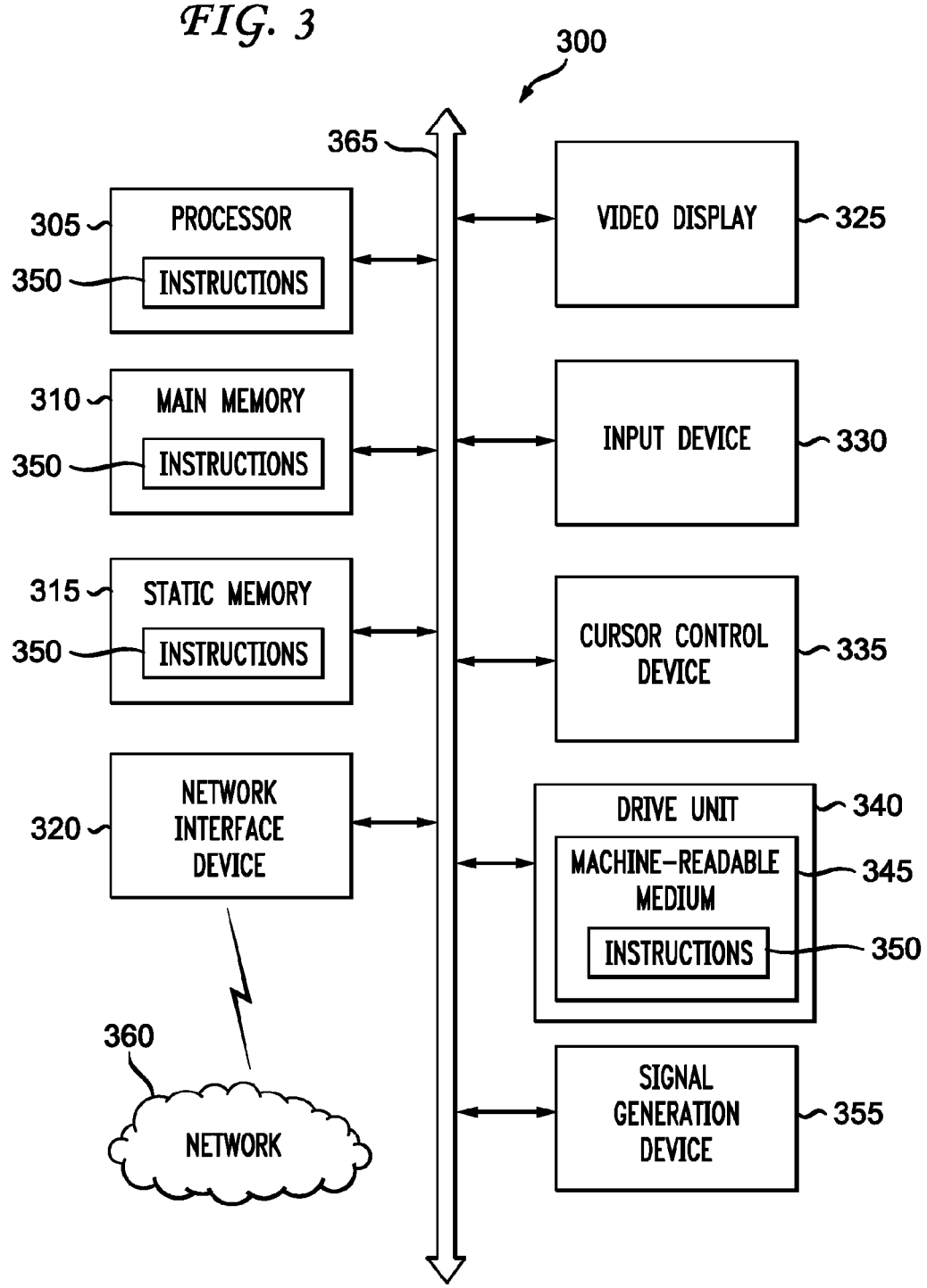

OPTICAL BANDWIDTH CONTROL DEVICE

BACKGROUND

1. Field

The present application relates generally to the field of networking using optical fibers. More specifically, the disclosure provided herein relates to an optical control device that allows a network provider to selectively limit a transport rate through a fiber.

2. Brief Description of the Related Art

Traditionally, network service providers provision transport services to specifically match the protocol, speed, and service characteristics requested. With the advent of managed Dense Wavelength Division Multiplexing (DWDM) services, that process changed somewhat for the active Wavelength Division Multiplexing (WDM) network elements involved, with transparent data transport (payload and overhead) being the provisioning goal for wavelength services, and with some parameters regarding expected protocol and speed characteristics still being required for managing the quality of service (QOS).

As a result of the availability of DWDM services, there is a demand for individual circuits or fiber lines between two or more related systems, such as a between two devices in a corporation. For example, the user may purchase a T-1 or OC3 line which requires the user to pay in accordance with the rate of data that is capable of being transmitted over the line. A disadvantage of the use of DWDM over a short distance is that it is expensive to obtain an individual circuit, when only a dry fiber line may be needed. In many cases, transport service needs may technically and cost effectively be supported via dry fiber solutions.

Dry fiber only includes a cable of fiber and does not include a cable with electronics or network elements. For example, dry fiber may be used in physical connections at a central office between two devices in the office. However, dry fiber cannot be used where electronics are needed. For example, dry fiber cannot be used for wireless devices, such as, a cell phone.

When dry fiber is used, there is currently no means for monitoring the use. As a result, dry fiber has not been sold as a product to users, since network providers cannot monitor and charge a dollar amount per number of bits being sent over the fiber. With no active control or management, these dry-fiber-only solutions are not desirable from a network provider perspective since the customer or user can exploit the fiber's capabilities and utilize bandwidths up to the capacity of the fiber route. In many cases, the fiber route can range from sub-10 Mbps to rates exceeding 40 Gbps (with technology allowing up to 100 Gbps nearing commercial availability).

Since the network provider is unable to monitor the bandwidth being used in dry fiber solutions, network providers are presented with significant strategic pricing and quality-of-service issues. Most network providers either do not offer dry fiber lines as a cost-effective solution or offer dry fiber lines at an exorbitant price because the network providers want to cover a worst case scenario. However, few users are willing to pay the exorbitant price. Consequently, dry fiber lines are not efficiently utilized due to their absence in the market.

SUMMARY

The present invention provides an in-line optical control device for controlling bandwidth in a dry fiber line. The in-line optical control device includes a splitter, an optical switch, and a processing device. The splitter may be configured to split an input signal. The optical switch may be configured to receive and selectively connect a first portion of the split input signal to the dry fiber line. The optical switch may thereby control a rate of data transmitted over the dry fiber line. The processing device may be configured to control the optical switch based on whether a characteristic of the input signal conforms to a predetermined limit using a second portion of the split input signal. The processing device may thereby control bandwidth in the dry fiber line.

The present invention further describes a method for controlling bandwidth in a dry fiber line. The method begins by splitting a signal from the dry fiber line into a first portion and a second portion. Next, the method determines, with a processing device, whether a characteristic of the input signal conforms to a predetermined limit using the second portion of the split input signal. Then, the method selectively connects the first portion of the split input signal to the dry fiber line. The connection is based on whether the characteristic of the input signal conforms to the predetermined limit. The method may thereby control the bandwidth in the dry fiber line.

The present invention yet further describes a non-transitory computer-readable medium including instructions that, when executed by a processing device, cause the processing device to control bandwidth of a dry fiber line. The instructions begin by splitting a signal from the dry fiber line into a first portion and a second portion. Next, the method determines, with a processing device, whether a characteristic of the input signal conforms to a predetermined limit using the second portion of the split input signal. Then, the method selectively connects the first portion of the split input signal to the dry fiber line. The connection is based on whether the characteristic of the input signal conforms to the predetermined limit. The instructions may thereby control the bandwidth in the dry fiber line.

Other objects and features of the present application will become apparent from the following detailed description considered in conjunction with the accompanying drawings. It is to be understood, however, that the drawings are designed as an illustration only and not as a definition of the limits of the application.

BRIEF DESCRIPTION OF THE DRAWINGS

The drawings constitute a part of this specification and include exemplary embodiments, which may be implemented in various forms. It is to be understood that in some instances various aspects may be shown exaggerated or enlarged in the drawings to facilitate understanding of the embodiments.

FIG. 3 shows an exemplary computer system for use with the optical bandwidth control device of FIG. 1 and the method of FIG. 2.

DETAILED DESCRIPTION

A small, low-cost, optical in-line device that exhibits the ability to determine the bandwidth of an optical signal and actively compare a rate of data being transported by the signal within a predetermined or allocated limit is provided herein. The optical in-line control device may include an optical bandwidth control device that is installed in an optical fiber path to allow transparent data to be transported up to a preset bandwidth and/or rate.

The in-line optical control device may allow a network provider to selectively limit the transport rate through a fiber as a means to monitor and/or control the service bandwidth metric. For example, if the optical data rate exceeds the predetermined limit, the optical path is opened and transmission is terminated. Moreover, the device management may provide the ability to inhibit the rate limiting function, command the optical path to be opened and/or closed, set and/or retrieve operational limits and/or settings, provide alarm and/or status indications, and retrieve device and/or signal history. The embodiments of the device may extend to include detection of incoming light, optical power level measurement, signal rate detection, provision of remote and/or local commands to inhibit and/or deny data transport capability, provision of remote and/or local alarms, providing remote and/or local device provisioning and/or management, and a physical signal monitor port.

Figure 1:
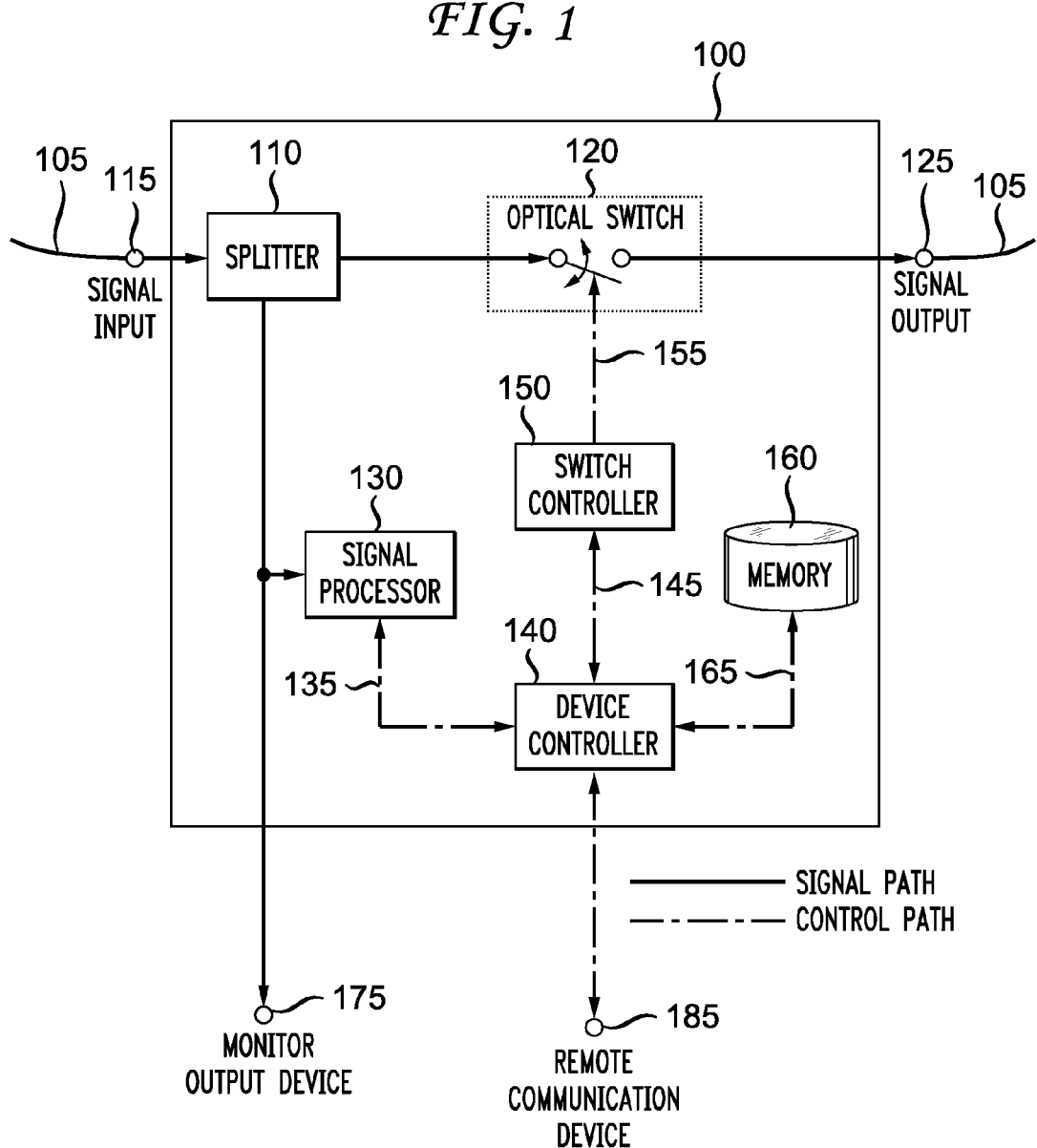
FIG. 1 shows a block diagram of an exemplary optical bandwidth control device.

With reference to FIG. 1, a block diagram of an in-line optical control device 100 for controlling bandwidth in a dry fiber line is shown. The in-line optical control device 100 includes a splitter 110, an optical switch 120, a signal processor 130, a device controller 140, a switch controller 150, and optionally, a memory 160. The signal processor 130, the device controller 140, and the switch controller 150 may each be individual devices or one device. For example, a processing device may be configured to perform the functions of one or more of each of the signal processor 130, the device controller 140, and the switch controller 150, as described herein.

The in-line optical control device 100 may be operatively connected to an optical path 105 that may be configured to transport a signal. The optical path 105 may be a dry fiber line that connects two or more network devices and carries signals between the two or more network devices. The optical path is configured to transport a signal over an optical dry fiber line and through the in-line optical control device 100 via the signal input line 115 and the signal output line 125. As one skilled in the art will appreciate, a dry fiber line may include a cable made of optical fibers that does not contain any electronics or network elements.

The splitter 110 may be a passive device configured to receive a signal from a signal input line 115 and transmit the signal along one or more optical fiber paths. The splitter 110 may, for example, transmit a first portion of the signal to the optical switch 120, which may allow the signal to be sent through the in-line optical control device 100 to a signal output line 125. The splitter 110 may also transmit a second portion of the signal to a signal processor 130, and optionally to one or more additional optical fiber paths.

As one skilled in the art will appreciate, a splitter 110 may be a completely passive device that splits an original signal. The split signals, which may be divided into two or more portions, may each be identical, differing only in their power level or amplitude. As such, the sum of each portion of the split signal may be equal to the original power level or amplitude of the original signal. For example, the data rate, wave form, and 1's and 0's of the signal may be the same for both the original signal and the split signal.

The splitter 110 may further be configured to allow most of the signal that comes into the in-line optical control device 100 via the signal input line 115 to flow through the device while splitting a small portion of the signal for analysis. The signal input line 115 carries the signal from the optical path 105 to the splitter 110. From the splitter 110 the signal passes through to the optical switch 120 and through the in-line optical control device 100 to the signal output line 125, which connects to the optical path 105. The signal passing through the optical switch 120 may have a slightly lower optical power because the splitter 110 may route a small portion of the signal to the signal processor 130 and optionally, the monitor output line 175.

For example, the splitter 110 may split or divide the path of the signal as follows: ninety (90) percent of the amplitude of the signal may be routed through the optical switch 120 to the signal output line 125 and the remaining ten (10) percent of the amplitude of the signal may be routed to the signal processor 130 and/or the monitor output line 175; or ninety-five (95) percent of the amplitude of the signal may be routed through the optical switch 120 to the signal output line 125 and the remaining five (5) percent of the amplitude of the signal may be routed to the signal processor 130 and/or the monitor output line 175. The portion of the signal sent to the signal processor 130 may be determined by the signal processor's 130 input requirements. The portion of the signal sent to the monitor output line 175 may be determined by the optical power levels required by a monitoring device (not shown) connected to the monitor output line 175. The signal processor 130 and the monitor output line 175 will be discussed in detail below.

The optical switch 120 may be configured to control the rate of data transmitted over the dry fiber line. The optical switch 120 may control the rate of data transmitted over the dry fiber line by receiving at least a first portion of the signal in the dry fiber line. The optical switch 120 may simultaneously receive commands that control the opening and closing of the optical switch. The commands may be sent from the device controller 140 to the in-line optical switch 120 via the switch controller 150, as discussed below.

The optical switch 120 may be an optical input, an optical cross-point, and an optical output switch (also referred to as an OOO type optical switch). The OOO type optical switch has no intermediate conversion to electrical signals and is configured as a simple single pole single throw implementation (SPST), and the optical switch 120 may be an embodiment of many available OOO technologies, as one skilled in the art will appreciate. An implementation would have to factor in optical loss, cost, and management and/or control complexity. Potential OOO technologies include, for example, electro-mechanical, bubble, micro electromechanical (MEMS), and liquid crystal.

The optical switch 120 functionalities are important, in that the optical switch 120 may be configured to control the rate of data transported over the dry fiber line according to network provider limits. Moreover, use of an optical switch 120 capable of responding to remote commands is desirable, in that, the remote commands may be used to break a switch, i.e., one command may be used to remotely and immediately open a circuit. As one skilled in the art will appreciate, the optical switch 120 used may include various optical switches that enable signals in optical fibers to be selectively opened or closed.

A first example of a type of optical switch 120 that may be used with the in-line optical control device 100 includes a uniphase switch that has a protection device with two inputs, a signal input and a control input. The signal input may be transported through the optical switch 120 towards the signal output line 125. The control input may be configured to control the opening and the closing of the optical switch, which may be used to limit or set input data rates.

A second example of a type of optical switch 120 that may be used with the in-line optical control device 100 includes an in-line switch that monitors the rate of data using the signal. The in-line switch may be configured to remain closed when the rate of data is within the limit and open when the rate of data exceeds the limit. No matter which type of optical switch 120 is used, the optical switch 120 may provide service provider solutions that are and are not related to the size or the speed of the fiber. Accordingly, the optical switch 120 may enable service providers to collect money for usage of fiber. Moreover, the service provider, user, and/or government may use the optical switch 120 to add an additional level of security to a network connection by using the switch to monitor traffic and open a circuit remotely due to security of the network being exposed to a security threat.

The signal processor 130 may be configured to receive a second portion of the signal from the splitter 110. The signal processor 130 actively analyzes the second portion of the signal (or "tap") from the splitter 110. The signal processor 130 may determine at least one value representing a characteristic of the signal. Examples of characteristics include: synchronization, optical power level, the data rate, and possibly, the wavelength and/or specific protocol. The signal processor's 130 determination of the signal input line characteristics are transmitted to the device controller 140. Note that the analysis of the second portion of the signal is continuous and is performed independent of the current switch position.

The device controller 140 receives the at least one value using a coupling 135 from the signal processor 130 and uses the at least one value to determine if the signal conforms to at least one predetermined limit or parameter. For example, the signal conformity may be determined by comparing a signal's data transport rate to a predetermined limit. If the signal's transport rate is below the predetermined limit, then the device controller 140 may determine that the signal's transport rate conforms. However, if the signal's transport rate exceeds the predetermined limit, then the device controller 140 may determine that the signal's transport rate does not conform.

The device controller 140 may then transmit commands using a coupling 145 to the switch controller 150 based on the conformity determination. The device controller 140 may also manage the in-line optical control device 100; provide time-of-day tags; initiate alarms; control external communications, queries, and/or commands; store provisioning, performance, and/or temporary information in memory; and initiate open and/or close commands to the switch controller 150.

The device controller 140 may optionally be connected to a remote communication device 185 or network (not shown) and communicate therewith, as one skilled in the art will appreciate. The device controller 140 may transmit, for example, the following status data to the remote communication device 185: data relating to initiation of alarms, provisioning parameters (i.e., limits, passwords), security management, retrieval of device status, logging history, and input parameters. Moreover, the remote communication device 185 may be a typical computer system, such as, an onsite computing device. The onsite computing device may include a personal computer (PC), a remote computing device, or a network (i.e., connection to a control LAN network and/or technical support system).

The switch controller 150 manages the opening and the closing using a coupling 155 of the optical switch 120 according to the commands from the device controller 140 and provides information using the coupling 145 relating to the status of the optical switch 120 back to device controller 140.

The memory 160 may optionally be included. The memory 160 may be operatively connected to the device controller 140 using a coupling 165 and may provide non-volatile storage of system information, such as, user passwords; time stamped signal characteristics, switch position, and/or alarm history; and interim storage needs for the device controller 140.

The monitor output line 175 may also be provided as a means for non-intrusive access to the signal input line 115. Non-intrusive access includes monitoring and access the signal input without interfering with the transport of the signal through the optical switch 120. The portion of the signal input line 115 transmitted to the monitor output line 175 may be referred to as the third portion of the signal, but may include any additional portions of the signal transmitted from the splitter 110, as one skilled in the art will appreciate.

The splitter 110 may route the third portion of the signal to the monitor output line 175 for such access. The monitor output line 175 may provide an attachment point for external analysis equipment, including, but not limited to, an optical power meter, a spectrum analyzer, an oscilloscope, or a protocol analyzer. For example, the in-line optical control device 100 may provide local access for the network provider to monitor a facility via the monitor output line 175. The monitor output line 175 may be connected to a monitoring device (not shown) that may, for example, use 5-10% of the bandwidth of the signal input line 115 to monitor usage of the dry fiber line and/or diagnose problems with data transmission along the dry fiber line.

In operation, the in-line optical control device 100 may work as follows. A signal travels through the optical path 105 and enters the in-line optical control device 100 at the signal input line 110, which sends the signal to the splitter 110. The splitter 110 divides or splits the signal. The splitter 110 routes a first portion of the signal to the optical switch 120. As one skilled in the art will appreciate, the signal continues through the signal output line 125 when the optical switch 120 circuit is closed and transmission of the signal stops at the optical switch 120 when the optical switch 120 circuit is opened.

The splitter 110 may simultaneously route a second portion of the signal to the signal processor 130 for internal analysis and a third portion may optionally be routed to the monitor output line 175 for external analysis, using a monitoring device (not shown), as one skilled in the art will appreciate. The external analysis may include analysis of the usage of the dry fiber line and/or trouble shooting to diagnosis problems with transmission of data over the dry fiber line.

The second portion of the signal is analyzed by the signal processor 130 to determine the rate of data being transmitted over the optical path 105. Results of the analysis may be transmitted to the device controller 140 using the coupling 135, which sends commands to the switch controller 150 using the coupling 145. The switch controller 150 in turn manages the opening and closing of the optical switch 120 using the coupling 155 and transmits information regarding the status of the optical switch 120 back to the device controller 140 using the coupling 145. Furthermore, the memory 160 may receive and store information from the device controller 140 using the coupling 165.

Figure 2:
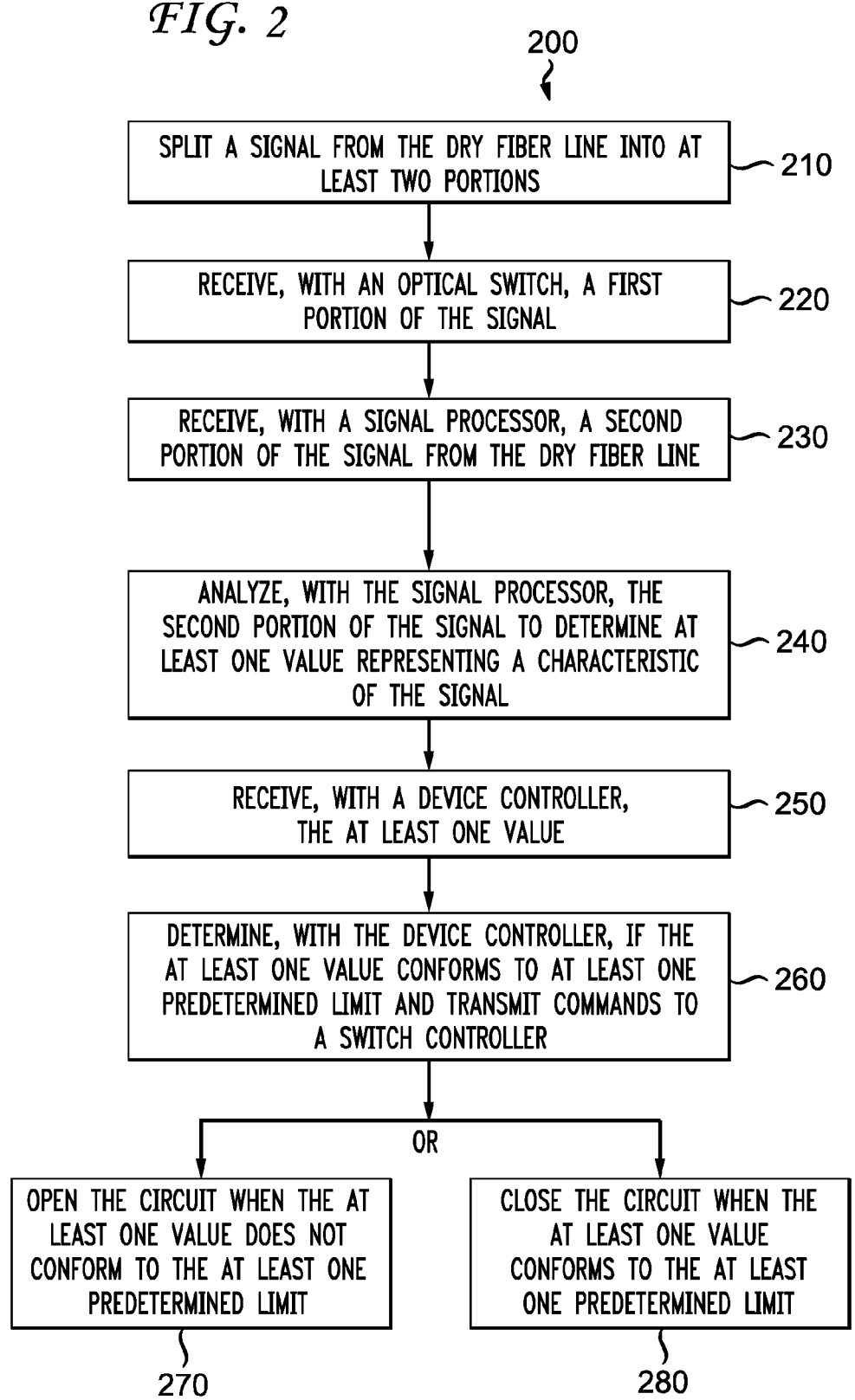
FIG. 2 shows a method for controlling bandwidth in a dry fiber line using the optical bandwidth control device of FIG. 1.

FIG. 2 provides a method 200 for controlling the bandwidth in a dry fiber line. The method begins by splitting a signal from the dry fiber line into at least two portions, as provided at reference 210. Next, an optical switch receives at least a first portion of the signal, at reference 220. The optical switch may be configured to control the rate of data transmitted over the dry fiber line. Then, as provided at references 230 and 240 a signal processor receives a second portion of the signal from the dry fiber line and analyzes the second portion of the signal. The analysis includes determining at least one value representing a characteristic of the signal. After that, the at least one value is received by a device controller at reference 250. Finally, the device controller determines if the at least one value conforms to at least one predetermined limit, at reference 260. The device controller transmits commands to a switch controller for providing (1) an opened circuit when the at least one value does not conform to the at least one predetermined limit, as provided at reference 270, or (2) a closed circuit when the at least one value conforms to the at least one predetermined limit, as provided at reference 280.

The method may further include receiving commands, in a memory. The memory configured to provide non-volatile storage of system information including one or more of the following: a user password, a history of time stamped signal characteristics, switch position history, alarm history, and interim storage. The method may also include receiving, with one or more external devices, a third portion of the signal through a monitor output line. The monitor output line is configured to receive non-intrusive access to the signal.

Moreover, the in-line optical control device 100 for controlling the bandwidth of a dry fiber line is compatible with any number of electronic communication devices and computing devices, including servers, a personal computers (PC), portable wireless devices (such as, smart phones via a connection through a control network), and/or electronic devices having similar functionality, as will be appreciated by those skilled in the art. For example, the in-line optical control device 100 may have built in Wi-Fi or use a wired connection with remote access capabilities in instances were wireless devices are used. FIG. 3 is a block diagram of a general computer system 300. The computer system 300 can include a set of instructions that can be executed to cause the computer system 300 to perform any one or more of the methods or computer based functions disclosed herein. The set of instructions may typically be run with TL-1 or SNMP over IP commands. The computer system 300, or any portion thereof, may operate as a standalone device or may be connected, e.g., using a network 360, to other computer systems or devices disclosed herein. For example, the computer system 300 may include or be included within any one or more of the systems, networks, hosts, routers, servers, proxy devices, or any other devices disclosed herein.

In a networked deployment, the computer system 300 may operate in the capacity of a server or a client machine in a server-client network environment, or a peer machine in a peer-to-peer (or distributed) network environment. The computer system 300 can also be implemented as or incorporated into various devices, such as, a PC, a tablet PC, a personal digital assistant (PDA), a web appliance, a communications device, a mobile device, a wireless telephone through an intervening control network, a control system, a network router, switch or bridge, or any other machine capable of executing a set of instructions (sequential or otherwise) that specify actions to be taken by that machine. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 305, e.g., a central processing unit (CPU), a graphics-processing unit (GPU), or both. Moreover, the computer system 300 can include a main memory 310 and a static memory 315 that can communicate with each other via a bus 365. As shown, the computer system 300 may further include a video display unit 325, such as, a liquid crystal display (LCD), an organic light emitting diode (OLED), a flat panel display, a solid state display, or a cathode ray tube (CRT). Additionally, the computer system 300 may include an input device 330, such as, a keyboard, and a cursor control device 335, such as, a mouse. The computer system 300 can also include a disk drive unit 340, a signal generation device 355, such as, a speaker or remote control, and a network interface device 320.

In a particular embodiment, as depicted in FIG. 3, the disk drive unit 340 may include a machine or a computer-readable medium 345 in which one or more sets of instructions 350 (e.g., software) can be embedded. Further, the instructions 350 may embody one or more of the methods or logic as described herein with reference to FIGS. 1 and 2. In a particular embodiment, the instructions 350 may reside completely, or at least partially, within the main memory 310, the static memory 315, and/or within the processor 305 during execution by the computer system 300. The main memory 310 and the processor 305 may also include a computer-readable media.

In an alternative embodiment, dedicated hardware implementations, such as, application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various embodiments, the methods described herein may be implemented by software programs that are tangibly embodied in a processor-readable medium and that may be executed by a processor. Further, in an example, non-limited embodiment, implementations can include distributed processing, component/object distributed processing, and parallel processing. Alternatively, virtual computer system processing can be constructed to implement one or more of the methods or functionality as described herein, using a computer or human, including entry of manual commands, use of a command line interface (CLI) or use of a graphical user interface (GUI).

While the computer-readable medium is shown to be a single medium, the term "computer-readable medium" includes a single medium or multiple media, such as, a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory, such as, a memory card or other package that houses one or more non-volatile read-only memories. Further, the computer-readable medium can be a random access memory or other volatile re-writable memory. Additionally, the computer-readable medium can include a magneto-optical or optical medium, such as, a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

Advantages of the in-line optical control device 100 include enabling the network providers to have a viable means to deploy dry fiber based solutions with managed, tier based pricing. Network providers may have a business based means to exploit lower cost dry fiber based solutions that are considered non-strategic or non-profitable today. Moreover, network providers may be able to offer alternatives to existing wavelength services at significantly lower internal costs as compared to active DWDM system based solutions. The network providers may also augment existing wavelength service offerings by allowing granular, rate based, tier pricing options.

Furthermore, the in-line optical control device may provide a rapidly implemented layer 0/1 based optical isolation capability in those instances where a government or private network deems high layer techniques are not adequate, such as, for security. For example, from a customer network security standpoint, governments and large corporations are concerned about security risks and have many methods to detect remote attacks via external communications links. In the cases where access to customer assets is optical, they have IT/Communications groups that can detect and isolate those attacks via applications at layer 2 and above. Attack isolation can take time. If the attack is deemed extreme or the information involved is considered sensitive, a fast termination of the optical link could be warranted. However, a graceful shutdown of equipment takes time and could additionally impact investigation data. The in-line optical control device 100 provides an advantageous solution by enabling the network provider the option of manually open the external fiber connection to the user's equipment through remote commands. Thus, the in-line optical control device 100 provides a unique solution in the area of network security for those applications where fast optical isolation is desired over higher layer or more invasive power kill-switch solutions.

Although the present specification describes components and functions that may be implemented in particular embodiments with reference to particular standards and protocols, the invention is not limited to such standards and protocols. Such standards are periodically superseded by faster or more efficient equivalents having essentially the same functions. Accordingly, replacement standards and protocols having the same or similar functions as those disclosed herein are considered equivalents thereof.

Thus, an in-line optical control device 100 for limiting the signal bandwidth and/or data transport rate has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. The Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An in-line optical control device to control bandwidth in a dry fiber line comprising:
   a splitter, the splitter splitting an input signal into a first portion and a second portion;
   an optical switch, the optical switch receiving and selectively coupling the first portion of the input signal to the dry fiber line, thereby controlling a rate of data transmitted over the dry fiber line, the optical switch including an in-line switch that monitors the rate of data using the input signal, the in-line switch closing in response to the rate of data being within the predetermined limit, the in-line switch opening in response to the rate of data exceeding the predetermined limit; and
   a processing device, the processing device controlling the optical switch based on whether a characteristic of the input signal conforms to a predetermined limit using the second portion of the input signal, thereby controlling bandwidth in the dry fiber line.

2. The in-line optical control device of claim 1, wherein the processing device stores command history information in a memory.

3. The in-line optical control device of claim 2, wherein the memory stores a user password, a history of time-stamped signal characteristics, a switch position history, and an alarm history.

4. The in-line optical control device of claim 1, wherein the optical switch is a uniphase switch including two inputs, the two inputs being coupled to the first portion of the input signal and a control signal, the control signal being received from the processing device to control opening and closing of the optical switch.

5. The in-line optical control device of claim 1, wherein the optical switch includes an optical input, an optical crosspoint, and an optical output.

6. The in-line optical control device of claim 1, wherein the splitter includes a passive device.

7. The in-line optical control device of claim 1, wherein the processing device transmits status data to a remote communication device.

8. The in-line optical control device of claim 1, wherein a third portion of the split input signal is received by an external device through a monitor output line, the monitor output line receiving non-intrusive access to the input signal.

9. The in-line optical control device of claim 8, wherein the external device includes an optical power meter.

10. The in-line optical control device of claim 8, wherein the external device includes an oscilloscope.

11. The in-line optical control device of claim 8, wherein the external device includes a spectrum analyzer and a protocol analyzer.

12. A method to control bandwidth in a dry fiber line comprising:
    splitting, using a splitter, an input signal into a first portion and a second portion;
    determining, using a processing device, whether a characteristic of the input signal conforms to a predetermined limit using the second portion of the input signal;
    coupling, using the processing device, selectively the first portion of the input signal to the dry fiber line based on whether the characteristic of the input signal conforms to the predetermined limit, thereby controlling bandwidth in the dry fiber line;
    monitoring, using the processing device, the rate of data using the input signal;
    closing, using the processing device, an in-line switch in response to the rate of data being within the predetermined limit;
    opening, using the processing device, the in-line switch in response to the rate of data exceeding the predetermined limit, thereby controlling bandwidth in the dry fiber line and the rate of data transmitted over the dry fiber line.

13. The method of claim 12, further comprising storing command history information in a memory, the memory storing a user password, a history of time stamped signal characteristics, a switch position history, and an alarm history.

14. The method of claim 12, further comprising receiving a third portion of the input signal through a monitor output line, the monitor output line receiving non-intrusive access to the input signal.

15. The method of claim 12, further comprising receiving status data from the processing device using a remote communication device.

16. A computer-readable storage device to store instructions that, when executed by a processing device, cause the processing device to control bandwidth of a dry fiber line by performing operations comprising:
    splitting an input signal into a first portion and a second portion;
    determining whether a characteristic of the input signal conforms to a predetermined limit using the second portion of the input signal;
    coupling selectively the first portion of the input signal to the dry fiber line based on whether the characteristic of the input signal conforms to the predetermined limit, thereby controlling bandwidth in the dry fiber line;
    monitoring the rate of data using the input signal;
    closing an in-line switch in response to the rate of data being within the predetermined limit; and
    opening the in-line switch in response to the rate of data exceeding the predetermined limit, thereby controlling bandwidth in the dry fiber line and the rate of data transmitted over the dry fiber line.

17. The computer-readable storage device of claim 16, wherein the operations further comprise controlling bandwidth of a dry fiber line by receiving command history information in a memory, the memory storing a user password, a history of time stamped signal characteristics, a switch position history, and an alarm history.

18. The computer-readable storage device of claim 16, wherein the operations further comprise controlling bandwidth of a dry fiber line by receiving a third portion of the input signal through a monitor output line, the monitor output line receiving non-intrusive access to the input signal.

19. The computer-readable storage device of claim 16, wherein the operations further comprise controlling bandwidth of a dry fiber line by receiving status data from the processing device using a remote communication device.

* * * * *